United States Patent
Tohyama et al.

(10) Patent No.: US 6,205,854 B1
(45) Date of Patent: Mar. 27, 2001

(54) HEAT-SENSITIVE TYPE FLOW SENSOR

(75) Inventors: Ryuji Tohyama; Naruki Suetake, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/188,374

(22) Filed: Nov. 10, 1998

(30) Foreign Application Priority Data

Jun. 3, 1998 (JP) .................................................. 10-154901

(51) Int. Cl.[7] ...................................................... G01F 1/68
(52) U.S. Cl. ..................................... 73/204.15; 73/204.18
(58) Field of Search ........................... 73/204.15, 204.18, 73/204.17

(56) References Cited

U.S. PATENT DOCUMENTS

| | | | | |
|---|---|---|---|---|
| 3,903,875 | * | 9/1975 | Hughes | 73/204.15 |
| 4,934,188 | * | 6/1990 | Tanimoto et al. | 73/204.15 |
| 5,359,891 | * | 11/1994 | Yamamoto et al. | 73/204.15 |
| 5,537,871 | * | 7/1996 | Itsuji et al. | 73/204.15 |
| 5,753,815 | * | 5/1998 | Murata | 73/204.15 |
| 6,032,526 | * | 3/2000 | Akamatsu | 73/204.15 |

FOREIGN PATENT DOCUMENTS 4-249717  9/1992 (JP) .

\* cited by examiner

*Primary Examiner*—Harshad Patel
(74) *Attorney, Agent, or Firm*—Sughrue, Mion, Zinn, Macpeak & Seas, PLLC

(57) ABSTRACT

A heat-sensitive type flow sensor which can be manufactured by using discrete parts at low cost in a miniature size with high accuracy and reliability includes a correcting circuitry capable of compensating for a detected current indicating a flow rate of a fluid of concern and outputted from a flow rate detecting circuit. In the heat-sensitive type flow sensor, an arithmetic processing circuit (200) for processing a detection voltage ($V_M$) supplied from a flow rate detecting circuit (100) and indicating the flow rate includes a voltage-to-current conversion circuitry (504) for converting the detection voltage ($V_M$) into a current ($I_1$) and capable of performing gain adjustment, a correcting circuitry (300) for correcting a level of a current signal ($I_2$) outputted from the voltage-to-current conversion circuit (500), and a detection current signal output circuit (600) for outputting the current signal ($I_{01}$) corrected by the correcting circuitry (300) as a detection output current signal of the heat-sensitive type flow sensor. The correcting circuitry (300) includes diodes implemented as discrete parts which need not exhibit identical characteristic.

7 Claims, 5 Drawing Sheets

HEAT-SENSITIVE TYPE FLOW SENSOR

BACKGROUND OF THE INVENTION

1. Field of the Invention

The present invention relates to a heat-sensitive type flow sensor for detecting a flow rate of a fluid by using heat-sensitive resistors.

2. Description of Related Art

In a conventional heat-sensitive type flow sensor known heretofore, a bridge circuit is employed which is constituted by a plurality of resistance elements inclusive of a first heat-sensitive resistor for detecting an atmospheric or ambient temperature and a second heat-sensitive resistor which is disposed within a passage through which a fluid flows such as, for example, an intake pipe of an internal combustion engine and heated electrically. To this end, a heating current supplied to the second heat-sensitive resistor for electrically heating it is so controlled that the temperature thereof is held higher than the ambient temperature by a predetermined value, wherein the quantity of heat which is deprived of the heat-sensitive resistor by the fluid whose flow rate is to be measured is detected in terms of change of the heating current flowing through the second heat-sensitive resistor. Thus, the flow rate of the fluid such as the intake air can be detected on the basis of the change of the heating current as detected.

Figure 5:
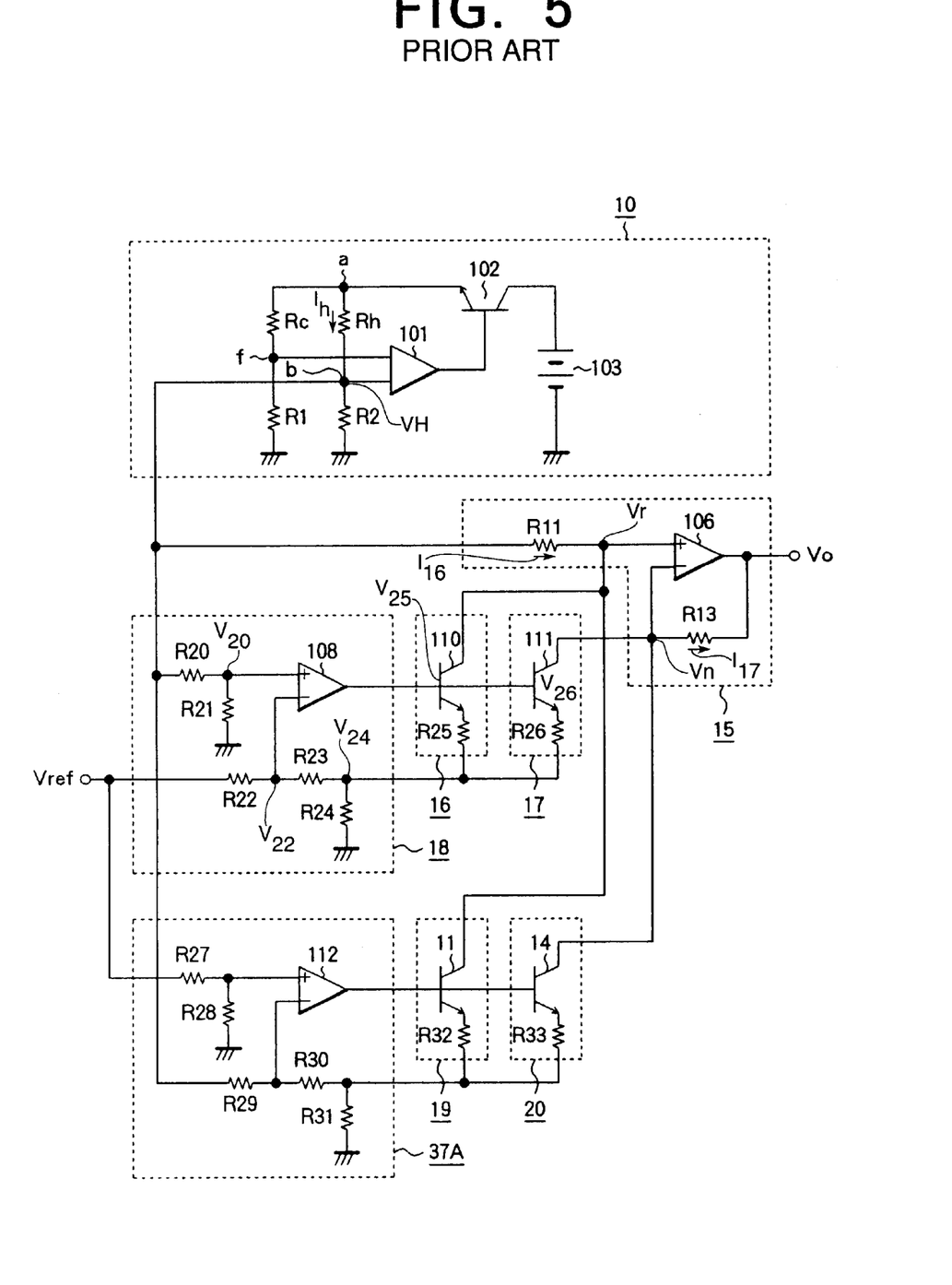
FIG. 5 is a circuit diagram showing a conventional heat-sensitive type flow sensor known heretofore.

For having better understanding of the present invention, description will first be made in some detail of a conventional heat-sensitive type flow sensor. FIG. 5 is a circuit diagram showing a circuit configuration of a hitherto known heat-sensitive type flow sensor such as disclosed, for example, in Japanese Unexamined Patent Application Publication No. 117436/1995 (JP-A-7-117436). Referring to the figure, the conventional heat-sensitive type flow sensor is comprised of a temperature control circuit 10, an operational amplifier circuit 15, a first constant current circuit 16, a second constant current circuit 17, a first constant current control circuit 18, a third constant current circuit 19, a fourth constant current circuit 20 and a second constant current control circuit 37A, details of which will be described below.

At first, description will be directed to the temperature control circuit 10. As can be seen in FIG. 5, the temperature control circuit 10 includes a bridge circuit constituted by resistors $R_1$ and $R_2$, a flow rate detecting heat-sensitive resistor $R_h$ and an ambient temperature detecting heat-sensitive resistor $R_c$, wherein a junction f between the resistor $R_1$ and the ambient temperature detecting heat-sensitive resistor $R_c$ and a junction b between the resistor $R_2$ and the flow rate detecting heat-sensitive resistor $R_h$ of the bridge circuit are connected, respectively, to input terminals of a differential amplifier 101 which has an output terminal connected to the base of a transistor 102, the emitter of which is connected to a junction a between the flow rate detecting heat-sensitive resistor $R_h$ and the ambient temperature detecting heat-sensitive resistor $R_c$ while the collector of the transistor 102 is connected to a positive or plus electrode of a DC power source 103 having the other electrode connected to the ground potential.

Next, description will turn to operation of the temperature control circuit 10. When the voltages at the junctions b and f become equal to each other, the bridge circuit assumes an equilibrium or balanced state. In this state, an electric current $I_h$ corresponding to the flow rate of a fluid concerned flows through the flow rate detecting heat-sensitive resistor $R_h$. The output voltage $V_H$ at the junction b can be given by a product of the current $I_h$ and the resistance value of the resistor $R_2$. This voltage $V_H$ is made use of as a flow rate signal.

With the view to compensating for dispersions in the flow-rate detection due to dispersions of resistance values of the heat-sensitive resistors $R_h$ and $R_c$ and the resistors $R_1$ and $R_2$ as well as temperature coefficients thereof, the detection output value at a predetermined flow rate (ordinarily a relatively low flow rate) is set as a target or desired value by adjusting the resistance value of the resistor $R_1$ for thereby changing or translating the detection characteristic of the heat-sensitive type flow sensor correspondingly.

Description will now turn to the operational amplifier circuit 15 which is designed to process the flow rate signal outputted from the temperature control circuit 10. The operational amplifier circuit 15 includes an operational amplifier 106 having an inverting input terminal and an output terminal interconnected by way of a feedback resistor $R_{13}$ and an input resistor $R_{11}$ having one end connected to the junction b of the bridge circuit mentioned above. The other end of the input resistor $R_{11}$ is connected to the non-inverting input terminal of the operational amplifier 106.

The first constant current circuit 16 includes a transistor 110 having an emitter coupled to a line of a reference source voltage $V_{ref}$ by way of a resistor $R_{25}$ and a collector connected to the non-inverting input terminal of the operational amplifier 106. On the other hand, the second constant current circuit 17 includes a transistor 111 having an emitter electrode connected to the line of the reference source voltage $V_{ref}$ by way of a resistor $R_{26}$ and a collector connected to the inverting input terminal of the operational amplifier 106. The base electrodes of both the transistors 110 and 111 are connected in cascade and connected in common to an output terminal of an operational amplifier 108 which constitutes a part of the first constant current control circuit 18 which will be described below.

The first constant current control circuit 18 mentioned above is so designed as to control the output current values $I_{16}$ and $I_{17}$ of the first and second constant current circuits 16 and 17, respectively, on the basis of the preset reference source voltage $V_{ref}$. To this end, the first constant current control circuit 18 is constituted by resistors $R_{20}$, $R_{21}$, $R_{22}$, $R_{23}$ and $R_{24}$ and an operational amplifier 108 connected in such a manner as can be seen in FIG. 5.

Further, the heat-sensitive type flow sensor includes the third constant current circuit 19 of a structure similar to that of the first constant current circuit 16, the fourth constant current circuit 20 implemented in an essentially same structure as that of the second constant current circuit 17 and the second constant current control circuit 37A implemented similarly to the first constant current control circuit 18.

Next, description will turn to operation of the operational amplifier circuit 15. The value or voltage level of the input voltage $V_p$ applied to the non-inverting input terminal of the operational amplifier 106 can be determined by subtracting from the output voltage $V_H$ of the temperature control circuit 10 a voltage drop making appearance across the resistor $R_{11}$ due to the current $I_{16}$ flowing through the resistor $R_{11}$ by way of the first constant current circuit 16. Namely, the input voltage $V_p$ mentioned above can be given by the following expression (1):

$$V_p = V_H - (R_{11} \times I_{16}) \tag{1}$$

On the other hand, the value or voltage level of the input voltage $V_n$ applied to the inverting input terminal of the operational amplifier 106 can be determined by subtracting from the output voltage $V_o$ of the operational amplifier circuit 15 a voltage drop making appearance across the resistor $R_{13}$ due to the current $I_{17}$ flowing through the resistor $R_{13}$ by way of the second constant current circuit 17. Namely, the input voltage $V_p$ mentioned above can be given by the following expression (2):

$$V_n = V_o - (R_{13} \times I_{17}) \qquad (2)$$

The operational amplifier 106 controls the output voltage $V_o$ of the operational amplifier circuit 15 such that the condition given by $V_p = V_n$ is satisfied. Thus, the output voltage $V_o$ of the heat-sensitive type flow sensor can be given by the following expression (3):

$$V_o = V_H - (R_{11} \times I_{16}) + (R_{13} \times I_{17}) \qquad (3)$$

In conjunction with the above expression (3), it is noted that when the resistance values of the resistors $R_{11}$ and $R_{13}$ are selected appropriately, e.g. $R_{11} = R_{13}$, the output voltage $V_o$ of the operational amplifier circuit 15 can be expressed as follows:

$$V_o = V_H - (I_{17} + I_{16}) \times R_{11} \qquad (4)$$

Next, operations of the first constant current circuit 16, the second constant current circuit 17 and the first constant current control circuit 18 will be described. Since the input voltage $V_{20}$ applied to the non-inverting input terminal of the operational amplifier 108 is derived from the voltage division of the output voltage $V_H$ of the temperature control circuit 10 by the resistors $R_{20}$ and $R_{21}$, the input voltage $V_{20}$ is given by the following expression (5):

$$V_{20} = \{R_{21}/(R_{20}+R_{21})\} \times V_H \qquad (5)$$

On the other hand, the input voltage $V_{22}$ applied to the inverting input terminal of the operational amplifier 108 is derived through voltage division of a potential difference between an inter-terminal voltage $V_{24}$ appearing across the resistor $R_{26}$ and the preset reference source voltage $V_{ref}$ by the resistors $R_{22}$ and $R_{23}$. Accordingly, the input voltage $V_{22}$ can be determined in accordance with the following expression (6):

$$V_{22} = R_{22}/(R_{22}+R_{23}) \times V_{24} + R_{23}/(R_{22}+R_{23}) \times V_{ref} \qquad (6)$$

The operational amplifier 108 controls the first and second constant currents $I_{16}$ and $I_{17}$ flowing through the resistor $R_{24}$ by controlling the base currents of the transistors 110 and 111, respectively, and further controls the inter-terminal voltage $V_{24}$ of the resistor 24 so that the condition $V_{20} = V_{22}$ can be satisfied. Accordingly, the following expression (7) holds true.

$$R_{21}/(R_{20}+R_{21}) \times V_H = R_{22}/(R_{22}+R_{23}) \times V_{24} + R_{23}/(R_{22}+R_{23}) \times V_{ref} \qquad (7)$$

From the expression (7), the inter-terminal voltage $V_{24}$ of the resistor $R_{24}$, i.e., voltage appearing across the resistor $R_{24}$, can be determined in accordance with the following expression (8):

$$V_{24} = R_{21}/(R_{20}+R_{21}) \times (R_{22}+R_{23})/R_{22} \times V_H - R_{22}/R_{23} \times V_{ref} \qquad (8)$$

In conjunction with the above expression (8), it is noted that when the resistances of the resistors $R_{20}$, $R_{21}$, $R_{22}$ and $R_{23}$ are dimensioned appropriately, e.g. $R_{20} = R_{21}$ and $R_{22} = R_{23}$, then the expression (8) can be simplified as follows:

$$V_{24} = V_H - V_{ref} \qquad (9)$$

Since the sum of the first and second constant currents, i.e., $I_{16} + I_{17}$, is equal to a sum of the current $I_{24}$ flowing through the resistor $R_{24}$ and the current $I_{23}$ flowing through a series circuit of the resistors $R_{23}$ and $R_{22}$, i.e., $I_{24} + I_{23}$, the sum of the first and second constant currents, i.e., $I_{16} + I_{17}$, is given by the following expression (10):

$$I_{16} + I_{17} = V_{24}/R_{24} + (V_{24} - V_{ref})/(R_{22}+R_{23}) \qquad (10)$$

In this conjunction, the following relations apply valid.

$$V_{24} = V_H - V_{ref} \text{ and } R_{22} = R_{23} \qquad (11)$$

Accordingly, the sum of the first and second constant currents, i.e., $I_{16} + I_{17}$, is given by the following expression (12):

$$I_{16} + I_{17} = (1/R_{24} + 1/2R_{22}) \times V_H - (1/R_{24} + 1/R_{22}) \times V_{ref} \qquad (12)$$

With the circuit configuration shown in FIG. 5, only the source current originating in the base currents of the transistors 110 and 111 is of significance to the output of the operational amplifier 108 without being accompanied by any sink current. Further, since the source current mentioned above becomes zero so long as the input voltage $V_{20}$ applied to the non-inverting input terminal of the operational amplifier 108 and the input voltage $V_{22}$ applied to the inverting input terminal thereof satisfy the condition that $V_{22} \geq V_{20}$, the first constant current $I_{16}$ as well as the second constant current $I_{17}$ is zero so long as the condition that $V_{22} \geq V_{20}$ is satisfied.

Accordingly, the sum of the first and second constant currents, i.e., $I_{16} + I_{17}$, becomes zero on the conditions that $R_{20} = R_{21}$ and $R_{22} = R_{23}$. Thus, the following expression (13) holds true:

$$V_{24} + V_{ref} \geq V_H \qquad (13)$$

In that case, from the expression (10) and in view of the condition that $R_{22} = R_{23}$, the voltage $V_{24}$ can be given by the following expression (14):

$$V_{24} = \{R_{24}/(2R_{22}+R_{24})\} \times V_{ref} \qquad (14)$$

The inter-terminal voltage $V_{24}$ can not assume voltage level which is not higher than the value given by the above expression. Accordingly, on the condition given by the expression (15), the following expression (16) holds true.

$$\{1 + R_{24}/(2R_{22}+R_{24})\} \times V_{ref} \geq V_H \qquad (15),$$

and $$I_{16} + I_{17} = 0 \qquad (16)$$

Next, ratios or relation between the first constant current $I_{16}$ and the second constant current $I_{17}$ will be considered. Both the bases of the transistors 110 and 111 are at a same voltage level because they are connected in common to the output terminal of the operational amplifier 108, as mentioned previously. Accordingly, assuming that the base-emitter voltage $V_{be}$ of the transistor 110 and that of the transistor 111 are equal to each other, the inter-terminal voltage $V_{25}$ appearing across the resistor $R_{25}$ is equal to the inter-terminal voltage $V_{26}$ which makes appearance across the resistor $R_{26}$. Thus, the relations given by the following expressions (17) applies valid.

$$V_{25} = I_{16} \times R_{25}$$

$$V_{26} = I_{17} \times R_{26}$$

$$V_{25} = V_{26} \qquad (17)$$

From the expression (17), the relation given by the following expression (18) applies valid.

$$I_{16}=(R_{26}/R_{25}) \times I_{17} \quad (18)$$

From the expressions (12) and (18), difference between the first constant current and the second constant current can be determined in accordance with the following expression (20):

$$I_{17} - I_{16} = (1-G_1)/(1+G_1) \times (I_{16}+I_{17}) \quad (20)$$

$$= (1-G_1)/(1+G_1) \times \{(1/R_{24}+1/2R_{22}) \times V_H -$$

$$(1/R_{24}+1/R_{22}) \times V_{ref}\}$$

where $G_1$ represents $R_{26}/R_{25}$.

From the above expression (20) and the expression (4) concerning the output voltage $V_o$ of the operational amplifier circuit 15, relation given by the following expression (21) can apply valid.

$$V_o = V_H + R_{11} \times (1-G_1)/(1+G_1) \times (I_{16}+I_{17}) \quad (21)$$

$$= V_H + R_{11} \times (1-G_1)/(1+G_1) \times$$

$$\{(1/R_{24}+1/2R_{22}) \times V_H - (1/R_{24}+1/R_{22}) \times V_{ref}\}$$

As is apparent from the above expression (21), the output voltage $V_o$ of the operational amplifier circuit 15 depends on the output voltage $V_H$ of the temperature control circuit 10 and becomes equal to the output voltage $V_H$ when the condition given by the following expression (22) is satisfied.

$$V_H \leq \{1+R_{24}/(2R_{22}+R_{24})\} \times V_{ref} \quad (22)$$

Further, when the condition given by the following expression (23):

$$V_H > \{1+R_{24}/(2R_{22}+R_{24})\} \times V_{ref} \quad (23)$$

is satisfied, a value which depends on the difference between the output voltage $V_H$ and the preset reference source voltage $V_{ref}$, the resistance values of the resistors $R_{11}$, $R_{22}$ and $R_{24}$ and the values of the ratio $G_1$ between the resistors $R_{25}$ and $R_{26}$ are added to or subtracted from the output voltage $V_H$ in dependence on the magnitude or value of the above-mentioned ratio $G_1$ with reference to zero.

As will be appreciated from a foregoing description, in the conventional heat-sensitive type flow sensor, the circuit constants for the constant current control circuits are determined on the presumption that the base-emitter voltage $V_{be}$ of the transistors 110 and 111 constituting the constant current circuits 16 and 17, respectively, are equal to each other and that the terminal voltages appearing across the resistors connected to the emitters of the transistors, respectively, are equal to each other.

However, in many of the heat-sensitive type flow sensors known heretofore, the transistors 110 and 111 constituting parts of the constant current circuits 16 and 17, respectively, are mounted as discrete components. Consequently, it is practically very difficult or impossible to ensure same operation characteristics for these transistors. In other words, the characteristics of these transistors will unavoidably differ from one to another. As a consequence, the output voltage $V_o$ of the operational amplifier circuit can not necessarily bear correspondence relation to the output voltage $V_H$ derived from the temperature control circuit with a reasonably sufficient fidelity. In order to eliminate these inconveniences, it is required to implement the first and second constant current circuits as well as the third and fourth constant current circuits as the integrated circuits to thereby uniformize the characteristics of these transistors. However, attempt for implementing the constant current circuits in the integrated circuit will encounter another problem that the cost involved in manufacturing the heat-sensitive flowmeter increases unprofitably.

SUMMARY OF THE INVENTION

In the light of the state of the art described above, it is an object of the present invention to provide a heat-sensitive type flow sensor which can be manufactured with high fidelity or accuracy and reliability even when the circuit elements mentioned above are realized by employing discrete parts.

Another object of the present invention is to provide a heat-sensitive type flow sensor which can be manufactured in a small size at low cost.

In general, the present invention teaches to provide a heat-sensitive type flow sensor with a correcting or compensating circuit which is capable of correcting or compensating for a detection current indicating a flow rate of a fluid of concern and outputted from a flow detecting means with high accuracy.

Thus, in view of the above and other objects which will become apparent as the description proceeds, there is provided according to a general aspect of the present invention a heat-sensitive type flow sensor which includes a flow rate detecting means disposed in association with a passage through which a fluid flows for detecting a flow rate of the fluid to thereby output a voltage of a level indicative of the flow rate, a voltage-to-current conversion means for converting the output voltage of the flow rate detecting means into a current, a correcting means for correcting a level of a current signal outputted from the voltage-to-current conversion means as the level of the output voltage indicative of the flow rate changes or drifts, and a current outputting means for outputting a current signal corrected by the correcting means as a detection output current signal indicative of the flow rate of the fluid.

By virtue of the provision of the current correcting or compensating means mentioned above, there can be realized a heat-sensitive type flow sensor whose detection output current signal is substantially evaded from the influences of voltage changes or drifts taking place in the heat-sensitive type flow sensor due to dispersion or variance of the characteristics of the circuit elements such as mentioned previously. Besides, the heat-sensitive type flow sensor can be manufactured inexpensively with uniformized characteristic by using discrete circuit elements.

In a mode for carrying out the invention, the correcting means should preferably include a means for making variable a correction starting point in dependence on change of the output voltage indicative of the flow rate.

With the arrangement mentioned above, the current correction or compensation starting point can be easily changed, to an advantage.

In another mode for carrying out the invention, the correcting means should preferably be so designed as to include a means for changing over increasing rate of the level of the current signal outputted from the current outputting means starting from the correction starting point.

Owing to the arrangement mentioned above, the current characteristic as demanded can be realized with ease, to another advantage.

In yet another mode for carrying out the invention, the correcting means should be so designed that the correction starting point is set at least at one of a time point at which the level of the output voltage indicative of the flow rate reaches or exceeds a preset reference voltage value and a time point at which the level of the output voltage indicative of the flow rate becomes lower than a preset reference voltage value.

Owing to the arrangement mentioned above, the current correction or compensation starting point can be easily changed, to an advantage.

In still another mode for carrying out the invention, a plurality of the correction starting points may be set in conjunction with the correcting means.

With the arrangement mentioned above, the correction or compensation starting point as well as the correcting or compensating current as demanded can be set without difficulty, to an advantage.

In a further mode for carrying out the invention, an output circuit of each of the voltage-to-current conversion means and the current outputting means may be constituted by a transistor circuit of Darlington connection type.

Owing to the arrangement mentioned above, errors or deviations of the base current of the transistor due to dispersion of the values and the temperature characteristics among the component of parts of the heat-sensitive type flow sensor can be reduced, which in turn means that the detection output current signal can be obtained with high fidelity and accuracy.

In a yet further mode for carrying out the invention, the voltage-to-current conversion means should preferably include a gain adjustment means for adjusting the level of the detection output current signal.

With the arrangement mentioned above, the number of the component parts can be reduced. Further, the heat-sensitive type flow sensor can be implemented on a substrate of a much reduced size, which will ultimately lead to implementing of the heat-sensitive type flow sensor in a miniaturized structure at low cost, to another advantage.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which:

FIGS. 2A to 2C are characteristic diagrams for illustrating operations of a correcting or compensating circuit incorporated in the heat-sensitive type flow sensor according to the first embodiment of the invention, wherein

DESCRIPTION OF THE PREFERRED EMBODIMENTS

The present invention will be described in detail in conjunction with what is presently considered as preferred or typical embodiments thereof by reference to the drawings.

Embodiment 1

Now, description will be made of a first embodiment of the present invention by reference to FIG. 1 which is a circuit diagram showing a circuit configuration of the heat-sensitive type flow sensor according to the first embodiment of the invention. Referring to the figure, the heat-sensitive type flow sensor now under consideration is comprised of a temperature control circuit 100 and an arithmetic processing circuit 200 which in turn includes a compensating or correcting circuitry 300 and an output circuitry 400, wherein the output circuitry 400 is comprised of a voltage-to-current converting circuit 500 and a detection current signal output circuit 600.

In general, the heat-sensitive type flow sensor according to the instant embodiment of the invention is implemented such that a detection voltage $V_M$ outputted from the temperature control circuit 100 and indicating the flow rate of a flowing fluid of concern undergoes voltage-to-current conversion by the voltage-to-current converting circuit 500, wherein a current $I_2$ resulting from the aforementioned voltage-current conversion is corrected or compensated for by the compensating or correcting circuitry 300 for outputting an output current signal $I_{O1}$ indicating or reflecting the flow rate with high fidelity through the detection current signal output circuit 600.

At first, description will be made of the temperature control circuit 100. As can be seen in FIG. 1, the temperature control circuit 100 is comprised of a bridge circuit including a flow rate detecting heat-sensitive resistor $R_H$, an atmospheric or ambient temperature detecting heat-sensitive resistor $R_K$, a flow rate detecting fixed resistor $R_M$ and a temperature compensating fixed resistor $R_1$, a differential amplifier 101 having input terminals connected to junctions b and f, respectively, of the bridge circuit, a transistor 102 and a DC power source 103, as is in the case of the conventional heat-sensitive type flow sensor.

More specifically, the output terminal of the differential amplifier 101 is connected to the base electrode of the transistor 102, the emitter of which is connected to a circuit point a of the bridge circuit, while the collector of the transistor 102 is connected to the positive or plus electrode of the DC power source 103, the other electrode of which is connected to the ground potential. Incidentally, the DC power source 103 may be constituted by a battery such as mounted on a motor vehicle. Parenthetically, operation of the temperature control circuit 100 is known and has been described hereinbefore in conjunction with the conventional heat-sensitive type flow sensor. Accordingly, repeated description thereof will be unnecessary.

Next, description will be directed to the arithmetic processing circuit 200. The arithmetic processing circuit 200 is comprised of the output circuitry 400 designed to output the current $I_2$ through voltage-to-current conversion of the detection voltage $V_M$ indicating the flow rate as supplied from the temperature control circuit 100 and the correcting circuitry 300 for correcting or compensating for the current $I_2$ resulting from the voltage-to-current conversion.

More specifically, the output circuitry 400 includes a voltage-to-current converting circuit 500 for converting the detection voltage $V_M$ supplied from the temperature control circuit 100 and indicating the flow rate into a current $I_2$, and a detection current signal output circuit 600 for outputting as a detection output current signal $I_{O1}$ of the heat-sensitive type flow sensor the current $I_2$ resulting from the above-mentioned voltage-to-current conversion and indicating the flow rate after the correction or compensation of the current $I_2$ by the correcting circuitry 300.

The voltage-to-current converting circuit 500 includes an operational amplifier 501 having an non-inverting input terminal to which the detection voltage $V_M$ is applied by way of a fixed resistor 503. A voltage-to-current converting resistor 504 is inserted between the inverting input terminal of the operational amplifier 501 and the ground potential. Further, the output terminal of the operational amplifier 501 is connected to the base of a transistor 505 by way of a fixed resistor 502. On the other hand, the emitter of the transistor 505 is connected to the inverting input terminal of the operational amplifier 501, while fixed resistors 605 and 606 constituting parts of the detection current signal output circuit 600 are connected in series between the collector of the transistor 505 and a terminal of the reference source voltage $V_{cc}$.

Next, description will turn to operation of the voltage-to-current converting circuit 500. The operational amplifier 501, the fixed resistor 502 and the transistor 505 cooperate to constitute a negative feedback circuit. Thus, representing by $V_M'$ the potential at the inverting input terminal of the operational amplifier 501, relation given by the following expression (24) applies valid.

$$V_M' = V_M \quad (24)$$

The potential or voltage $V_M'$ is converted into a current $I_1$ by means of the voltage-to-current converting resistor 504 in accordance with the following expression (25):

$$I_1 = V_M'/R_2 = V_M/R_2 \quad (25)$$

where $R_2$ represents the resistance value of the voltage-to-current converting resistor 504.

In this manner, the detection voltage $V_M$ indicative of the flow rate of a fluid undergoes the voltage-to-current conversion to be thereby converted into the detection current $I_1$ indicative of the flow rate. In this conjunction, it is to be mentioned that by implementing the voltage-to-current converting resistor 504 having the resistance value $R_2$ as an adjustable variable resistor instead of the fixed resistor, it is possible to effectuate both the voltage-to-current conversion and the gain adjustment concurrently. Representing the collector current and the emitter current of the transistor 505 by $I_{c1}$ and $I_{e1}$, respectively, the following expression (26) applies valid.

$$I_{c1} \approx I_{e1} = I_1 \quad (26)$$

Turning to the detection current signal output circuit 600, it includes an operational amplifier 601 having a non-inverting input terminal which is connected to a junction between the fixed resistors 605 and 606 with the inverting input terminal thereof being connected to the terminal of the reference source voltage $V_{cc}$ by way of a fixed resistor 604.

Further, the output terminal of the operational amplifier 601 is connected to the base of a transistor 603 by way of a fixed resistor 602. On the other hand, the emitter of the transistor 603 is connected to the inverting input terminal of the operational amplifier 601, wherein the detection output current signal $I_{O1}$ of the heat-sensitive type flow sensor is outputted from the collector of the transistor 603.

Operation of the detection current signal output circuit 600 will now be described without taking into consideration the operation of the correcting circuitry 300 for simplification of the description. Owing to the voltage-to-current conversion performed by the voltage-to-current converting circuit 500, the detection current $I_1$ indicative of the flow rate of a fluid flows through the transistor 505, the fixed resistor 605 having a resistance value $R_3$ and the fixed resistor 606 having a resistance value $R_4$. In that case, the inter-terminal voltages $V_1$ and $V_2$ making appearance across the fixed resistors 605 and 606, respectively, can be represented by the following expressions (27) and (28) on the basis of the expression (25).

$$V_1 = V_{cc} - \{(R_3+R_4)/R_2\} \times V_M \quad (27)$$

$$V_2 = V_{cc} - (R_3/R_2) \times V_M \quad (28)$$

Since the operational amplifier 601, the fixed resistor 602 and the transistor 603 cooperate to constitute the negative feedback circuit, as mentioned preciously, a so-called imaginary short-circuit state prevails. Consequently, when the potential at the inverting input terminal of the operational amplifier 601 is represented by $V_2'$, the following expression (29) applies valid.

$$V_2' = V_2 \quad (29)$$

Thus, the current $I_o$ given by the undermentioned expression (30) flows through a fixed resistor 604 having a resistance value $R_5$.

$$I_o = (V_{cc} - V_2)/R_5 = \{R_3/(R_2 \times R_5)\} \times V_M \quad (30)$$

Representing the collector current and the emitter current of the transistor 603 by $I_{c2}$ and $I_{e2}$, respectively, the following expression (31) applies valid.

$$I_{c2} \approx I_{e2} = I_o \quad (31)$$

In reality, however, the current flowing through the fixed resistors 605 ($R_3$) and 606 ($R_4$) is given as a sum of the detection current $I_1$ indicating the flow rate and the current $I_2$ because the correcting circuitry 300 is provided.

The compensating or correcting circuitry 300 is constituted by operational amplifiers 301 and 306, diodes 302 and 307, fixed resistors 303, 304, 308 and 309, and variable resistors 305 and 310 which are interconnected in such a manner as can be seen in the figure.

Figure 1:
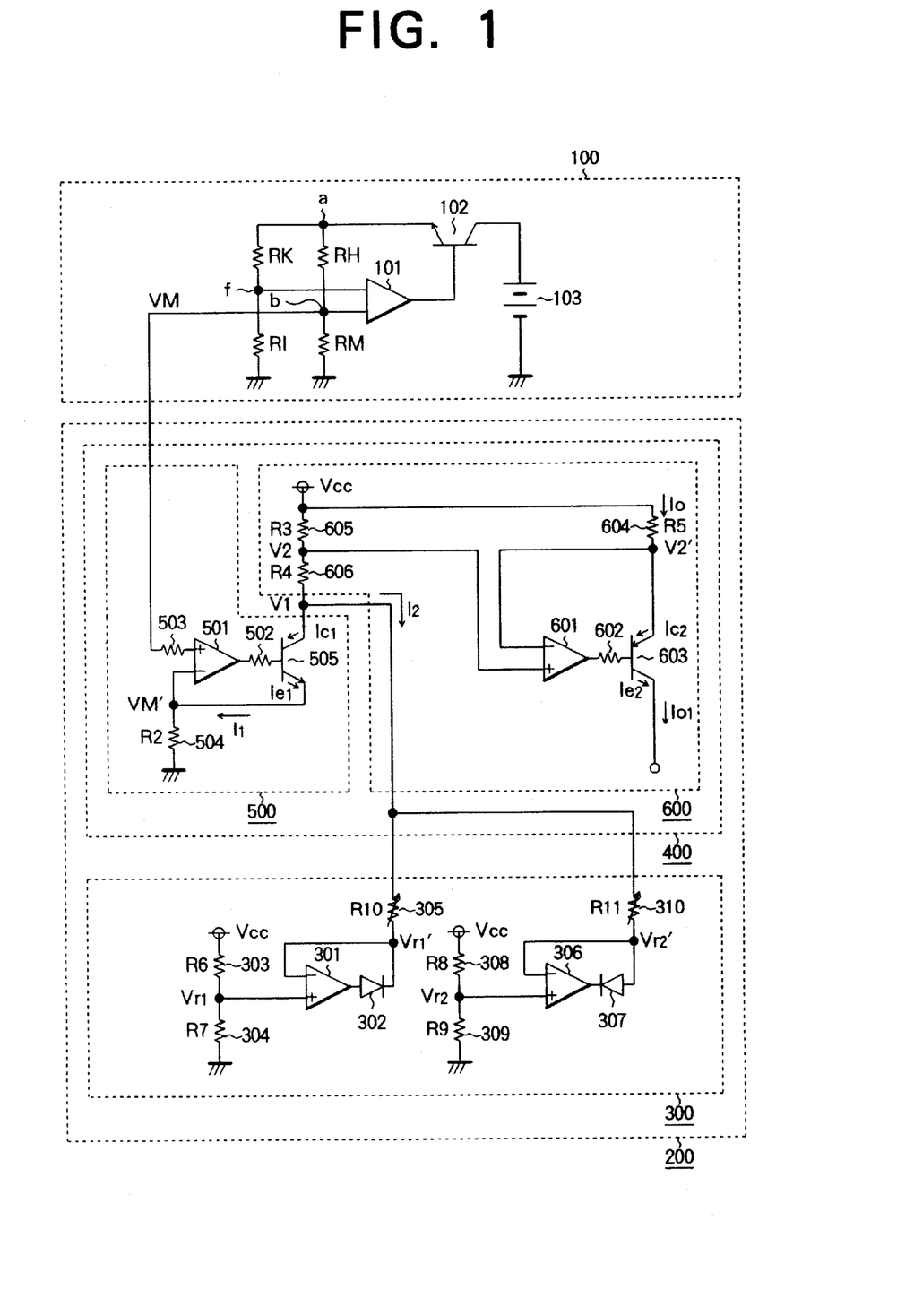
FIG. 1 is a circuit diagram showing a circuit configuration of a heat-sensitive type flow sensor according to a first embodiment of the present invention.

In operation, it is assumed that the correcting current $I_2$ flows toward the correcting circuitry 300, as illustrated in FIG. 1. Then, the voltages $V_1$ and $V_2$ making appearance across the fixed resistors 605 and 606, respectively, are given by the following expressions (32) and (33), respectively.

$$V_1 = V_{cc} - (R_3+R_4) \times (I_1+I_2) \quad (32)$$

$$V_2 = V_{cc} - R_3 \times (I_1+I_2) \quad (33)$$

where $I_1$ represents the detection current depending on the flow rate, and $I_2$ represents the current component utilized for the correction and is referred to as the compensating or correcting current.

From the expressions (30) and (33), the current $I_o$ flowing through the fixed resistor 604 is given by the following expression (34):

$$I_o=(R_3/R_5)\times(I_1+I_2) \qquad (34)$$

At this juncture, the potentials or voltages $V_{r1}$ and $V_{r2}$ at the non-inverting input terminals of the operational amplifiers 301 and 306, respectively, can be given by the following expressions (35) and (36), respectively.

$$V_{r1}=\{R_7/(R_6+R_7)\}\times V_{cc} \qquad (35)$$

$$V_{r2}=\{R_9/(R_8+R_9)\}\times V_{cc} \qquad (36)$$

Because of the ideal diode connections, respectively, between the operational amplifier 301 and the diode 302 and between the operational amplifier 306 and the diode 307, as shown in FIG. 1, such correcting current $I_2$ will flow to the correcting circuitry 300 which satisfies the conditions given by the following expressions (37) and (38):

$$V_{r1}=V_{r1}' \qquad (37)$$

$$V_{r2}=V_{r2}' \qquad (38)$$

where $V_{r1}'$ and $V_{r2}'$ represent potentials at the inverting input terminals of the operational amplifiers 301 and 306, respectively.

Figure 2A:
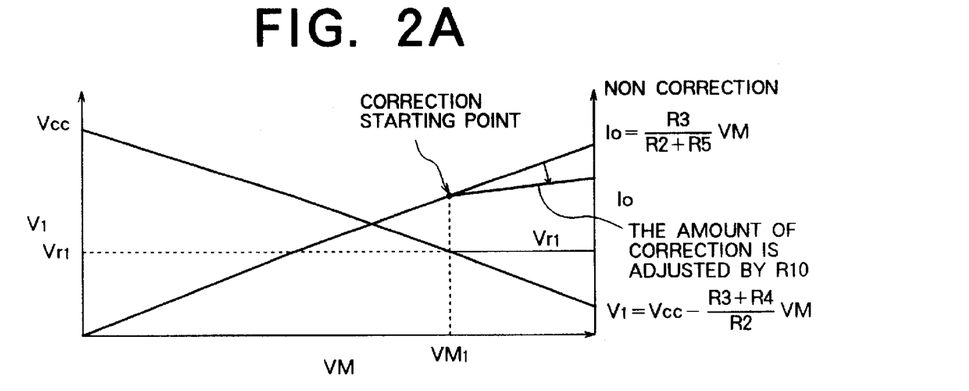
FIG. 2A is a view for illustrating operation of the correcting circuit in one state thereof.
Figure 2B:
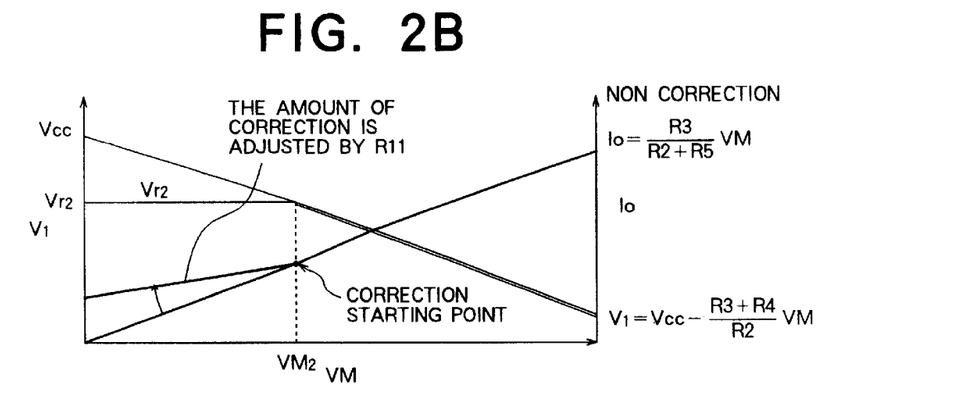
FIG. 2B is a view for illustrating operation of the correcting circuit in another state thereof.
Figure 2C:
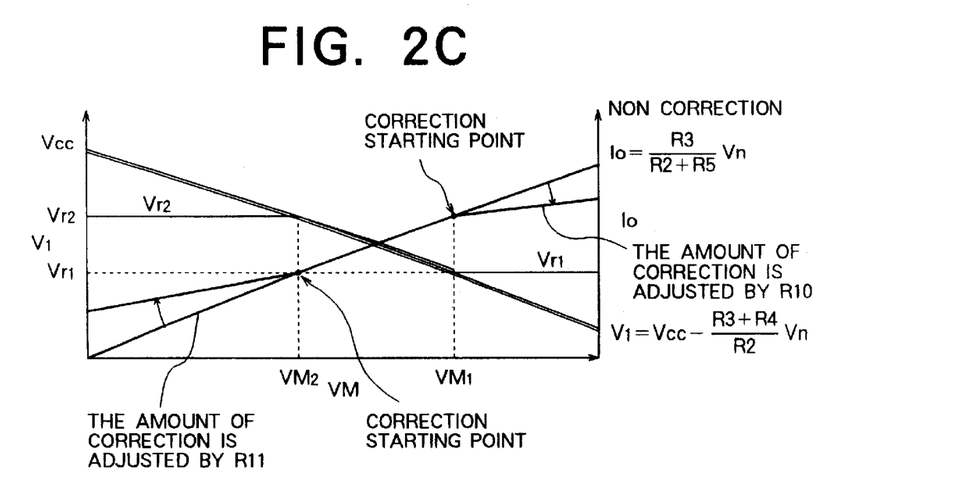
FIG. 2C is a view illustrating operation of the correcting circuit in still another state thereof.

Correction or compensation performed by the correcting circuitry 300 will be elucidated by referring to FIGS. 2A to 2C. FIG. 2A is a view illustrating graphically $V_M$-versus-$V_1$ characteristic and $V_M$-versus-$I_o$ characteristic on the assumption that a variable resistor 310 having a resistance value $R_{11}$ shown in FIG. 1 is opened. By taking as a parameter the detection voltage $V_M$ outputted from the temperature control circuit 100, the potential $V_1$ and the current $I_o$ (see FIG. 1) can be expressed as follows:

$$V_1=V_{cc}-\{(R_3+R_4)/R_2\}\times V_M$$

$$I_o=\{R_3/(R_2\times R_5)\}\times V_M$$

The correction of the detection current $I_1$ is performed with the non-inverting input voltage $V_{r1}$ set in accordance with the expression (35) in such a manner as described below.

When $V_1 > V_{r1}$, the direction in which the correcting current $I_2$ flows is reverse to the forward direction of the diode 302. Accordingly, no correcting current can flow. By contrast, when $V_1 \leq V_{r1}$, as shown in FIG. 2A, the direction of the correcting current $I_2$ coincides with the forward direction of the diode 302. Accordingly, the correcting current $I_2$ flows.

Thus, the condition enabling the correction or compensation of the detection current is given by $$V_1 \leq V_{r1} \qquad (39)$$

where $V_{r1}$ is given by $$V_{r1}=V_{cc}-\{(R_3+R_4)/R_2\}\times V_M \qquad (40)$$

Representing by $V_{M1}$ the detection voltage $V_M$ which satisfies the condition given by the expression (40), the condition enabling the correction or compensation can be expressed as follows:

$$V_M > V_{M1} \qquad (41)$$

On the other hand, the correcting current $I_2$ can be determined as follows:

$$I_2=(V_1-V_{r1})/R_{10} \qquad (42)$$

From the expressions (25), (42) and (34), the current $I_o$ can be given by the following expression (43):

$$I_o=\{R_3/(R_2\times R_5)\}V_M+\{R_3/(R_5\times R_{10})\}\times(V_1-V_{r1}) \qquad (43)$$

On the basis of the expressions (35) and (43), the correcting point can easily be set by adjusting the ratio of voltage division effected by the fixed resistor 303 ($R_6$) and the fixed resistor 304 ($R_7$), while the correcting current $I_2$ can easily be set by means of the variable resistor 305 ($R_{10}$).

FIG. 2B is a view illustrating graphically $V_M$-versus-$V_1$ characteristic and $V_M$-versus-$I_o$ characteristic on the assumption that the variable resistor 305 having a resistance value $R_{10}$ shown in FIG. 1 is opened. By taking the detection voltage $V_M$ as a parameter, the potential $V_1$ and the current $I_o$ can be expressed as follows:

$$V_1=V_{cc}-\{(R_3+R_4)/R_2\}\times V_M$$

$$I_o=\{R_3/(R_2\times R_5)\}\times V_M$$

The correction of the detection current $I_1$ is performed with the non-inverting input voltage $V_{r2}$ set in accordance with the expression (36) in the manner described below.

When $V_1 < V_{r2}$, the direction in which the correcting current $I_2$ flows is reverse to the forward direction of the diode 307. Accordingly, no correcting current can flow. By contrast, when $V_1 \geq V_{r2}$, as shown in FIG. 2B, the direction of the correcting current $I_2$ coincides with the forward direction of the diode 307. Accordingly, the correcting current $I_2$ flows.

Thus, the condition enabling the correction of the detection current is given by $$V_1 \geq V_{r2} \qquad (44)$$

where $V_{r2}$ is given by $$V_{r2}=V_{cc}-\{(R_3+R_4)/R_2\}\times V_M \qquad (45)$$

Representing by $V_{M2}$ the detection voltage $V_M$ which satisfies the condition given by the expression (45), the condition enabling the correction can be expressed as follows:

$$V_M \leq V_{M2} \qquad (46)$$

On the other hand, the correcting current $I_2$ can be determined as follows:

$$I_2=(V_1-V_{r2})/R_{11} \qquad (47)$$

From the expressions (25), (47) and (34), the current $I_o$ can be given by the following expression (48):

$$I_o=\{R_3/(R_2\times R_5)\}\times V_M+\{R_3/(R_5\times R_{11})\}\times(V_1-V_{r2}) \qquad (48)$$

From the expressions (36) and (48), the correcting point can easily be set by adjusting the ratio of voltage division effected by the fixed resistor 308 ($R_8$) and the fixed resistor 309 ($R_9$), while the correcting current $I_2$ can easily be set by means of the variable resistor 310 ($R_{11}$).

FIG. 2C is a diagram illustrating graphically $V_M$-versus-$V_1$ characteristic and the $V_M$-versus-$I_o$ characteristic when both the corrections illustrated in FIGS. 2A and 2B are concurrently effectuated. In this case, the correcting point and the current for the correction or compensation of the detection signal can be easily set, as will be readily understood from the description made with reference to FIGS. 2A and 2B.

Embodiment 2

Figure 3:
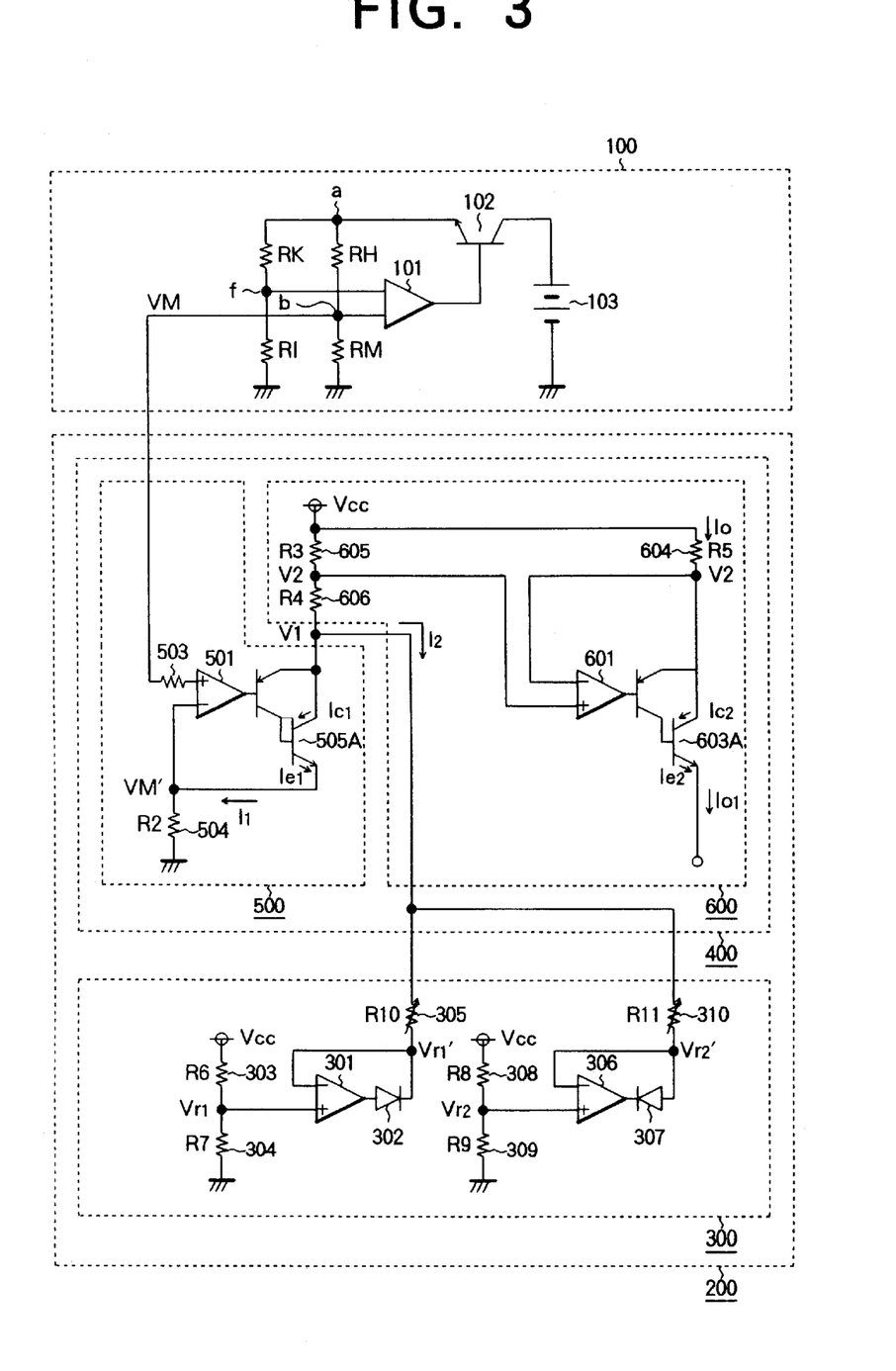
FIG. 3 is a circuit diagram showing a circuit configuration of a heat-sensitive type flow sensor according to a second embodiment of the present invention.

According to the teaching of the present invention incarnated in the second embodiment thereof, it is proposed to implement the transistor 505 and the transistor 603 which constitute parts of the voltage-to-current converting circuit 500 and the detection current signal output circuit 600, respectively, in the form of Darlington transistor circuits 603A and 505A, respectively, as shown in FIG. 3. With such circuit arrangement, there can be made available a large current amplification factor. This in turn means that errors due to dispersion or nonuniformity among the component parts as well as variations of the base currents due to temperature characteristics of the transistors can be suppressed, whereby the output signal of the heat-sensitive type flow sensor can be obtained with high accuracy and reliability.

Embodiment 3

Figure 4:
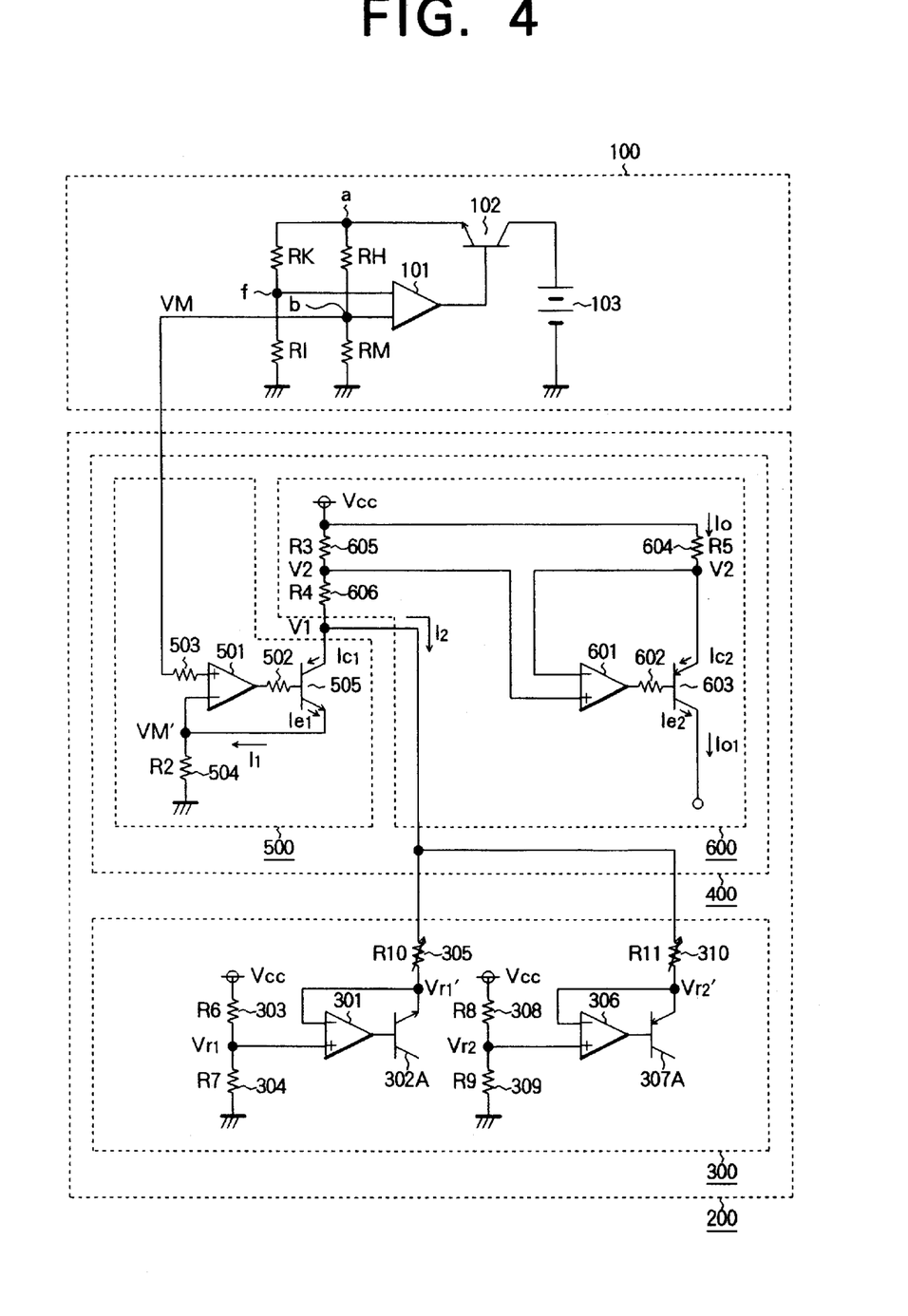
FIG. 4 is a circuit diagram showing a circuit configuration of a heat-sensitive type flow sensor according to a third embodiment of the present invention.

In the heat-sensitive type flow sensor according to a third embodiment of the present invention, the electronic parts constituting the ideal diode circuits are implemented by using base-emitter junctions (PN-junctions) of transistors 302A and 307A. By virtue of this arrangement, it becomes unnecessary to use the diodes of identical characteristic. In other words, the ideal diode circuits can be implemented by using discrete parts, which in turn means that the cost for fabrication of the heat-sensitive type flow sensor can be reduced, to another advantage.

Many modifications and variations of the present invention are possible in the light of the above techniques. It is therefore to be understood that within the scope of the appended claims, the invention may be practiced otherwise than as specifically described.

What is claimed is:

1. A heat-sensitive type flow sensor, comprising:
   flow rate detecting means having a detection portion disposed in association with a passage through which fluid flows, said flow rate detecting means for detecting a flow rate of said fluid to thereby output a voltage indicative of said flow rate;
   voltage-to-current conversion means for converting the output voltage of said flow rate detecting means into a current;
   correcting means for correcting a level of a current signal outputted from said voltage-to-current conversion means as the level of said output voltage indicative of said flow rate changes; and
   current outputting means for outputting a current signal corrected by said correcting means as a detection output current signal indicative of said flow rate of said fluid.

2. A heat-sensitive type flow sensor according to claim 1, wherein said correcting means includes means for making variable a correction starting point in dependence on change of said output voltage indicative of said flow rate.

3. A heat-sensitive type flow sensor according to claim 2, wherein said correcting means includes means for changing over increasing rate of the level of said current signal outputted from said current outputting means starting from said correction starting point.

4. A heat-sensitive type flow sensor according to claim 2, wherein said correcting means is so designed that said correction starting point is set at least at one of a time point at which the level of said output voltage indicative of said flow rate reaches or exceeds a preset reference voltage value and a time point at which the level of said output voltage indicative of said flow rate becomes lower than a preset reference voltage value.

5. A heat-sensitive type flow sensor according to claim 2, wherein a plurality of said correction starting points are set in conjunction with said correcting means.

6. A heat-sensitive type flow sensor according to claim 1, wherein an output circuit of each of said voltage-to-current conversion means and said current outputting means is constituted by a transistor circuitry of Darlington connection type.

7. A heat-sensitive type flow sensor according to claim 1, wherein said voltage-to-current conversion means includes gain adjustment means for adjusting the level of said detection output current signal.

* * * * *